United States Patent Office 3,763,207
Patented Oct. 2, 1973

3,763,207
PERFLUOROCYCLIC CARBINOL SULFATE SALTS
Dewey G. Holland, Allentown, Pa., and John H. Polevy, Attleboro, Mass., assignors to Air Products and Chemicals, Inc., Allentown, Pa.
No Drawing. Filed Nov. 7, 1969, Ser. No. 874,977
Int. Cl. C07c 141/02
U.S. Cl. 260—458          8 Claims

ABSTRACT OF THE DISCLOSURE

Compounds of the invention may be prepared by reacting $\alpha,\alpha$-dihydro-perfluorocyclohexane carbinol compositions with sulfonating agents and reacting the resulting compositions with alkali metal containing compositions to provide compounds having highly desirable physical properties when employed for a variety of uses, e.g. reducing surface tension.

BACKGROUND OF THE INVENTION

The present invention relates to alkali metal salts of perfluorocyclohexane carbinol compositions and, more particularly it relates to alkali metal salts of $\alpha,\alpha$-dihydro-perfluorocyclohexane carbinol sulfates. Such compositions are water soluble in quantities sufficient to be useful as surfactants in certain polymerization reactions, oil and soil repellants, corrosion inhibitors, additives for wax formulations and the like.

SUMMARY OF THE INVENTION

In accordance with the present invention, compounds are prepared having the general structure:

(I)          X—$C_6F_{10}$—$CH_2OSO_3^-$—$Y^+$ wherein,

X is fluorine or a $C_1$ to $C_{10}$ perfluoroalkyl group,
$C_6F_{10}$ is a perfluorinated cyclohexane moiety, and
Y is an alkali metal.

The compounds of the above structure are generally prepared by reacting a perfluorocyclohexane carbinol with a sulfonating agent to form a sulfate ester. The sulfate ester is then reacted with an alkali metal containing composition to provide the compounds of the invention.

PREFERRED EMBODIMENTS OF THE INVENTION

The perfluorocyclohexane carbinols that may be employed in producing the compounds of the present invention are represented by the following general structure:

(II)          X—$C_6F_{10}$—$CH_2OH$ wherein X is fluorine or a $C_1$ to $C_{10}$ perfluoroalkyl group.

The above carbinol compositions may be generally prepared in an electrolytic cell essentially of the type described in U.S. Pat. 2,519,983. The cell is loaded to capacity with liquid hydrogen fluoride. Direct current is applied to the cell and increased over a period of time until the current drawn is sufficiently low to indicate that the hydrogen fluoride is substantially free of moisture. To the dry electrolyte is added about ten percent, by weight, of aromatic acid chloride charge while maintaining the electrolyte temperature in the range of from about 35° to 65° F. by a jacket cooling system. The voltage applied is in the range of from about 5 to about 9 volts, providing a current density from about 5 to about 20 amperes per square foot of anode area. A reaction product of perfluoroalkyl substituted or unsubstituted perfluorocyclohexane carboxylic acid fluoride is precipitated from the electrolyte solution. The perfluorinated cyclic acid fluoride product is reacted with an alcohol to obtain the corresponding ester which is turn is reduced with lithium aluminum hydride to the corresponding alcohol, e.g. compounds of structure (II).

The above-described alcohol compounds are reacted with sulfonating agents to provide cyclic carbinol sulfates. Sulfonating agents that may be employed in producing the compounds of the present invention include sulfur trioxide, fuming sulfuric acid, chlorosulfonic acid and the like.

Alkali metal salts corresponding to compounds having the structure (I) are provided by reacting the cyclic carbinol sulfates obtained above with suitable alkali metal containing compositions. Such compositions include sodium hydroxide, potassium hydroxide, lithium hydroxide and the like.

The compounds of the invention being alkali metal salts are all sufficiently water soluble to have a variety of advantageous uses. For example, the compositions may be used as oil and soil repellants, surfactants in emulsion polymerization of unsaturated monomers, corrosion inhibitors, leveling agents for wax formulations and the like. Furthermore, the compositions provide highly desirable surface tension properties in the mentioned uses.

The following examples are illustrative of the invention and are not intended to limit the scope thereof.

EXAMPLE 1

To a flask containing 987 gms. of $\alpha,\alpha$-dihydro-undecafluorocyclohexane carbinol was slowly and cautiously added 855 gms. of fuming sulfuric acid (30–33 wt. percent $SO_3$). The mixture was stirred for about 16 hours maintaining a temperature of about 20° C. and subsequently the solution was poured into a container containing crushed ice. To the resulting solution was slowly added a 25% solution of potassium hydroxide, a slight excess being added over that amount necessary to neutralize the solution. A white precipitate was formed, separated by filtering and dried in a vacuum oven at 40° C. The product was identified to be potassium $\alpha,\alpha$-dihydroperfluorocyclohexane carbinol sulfate, weighed 1314 gms. to provide a 95.5% yield and had a melting point of greated than 250° C.

$C_7H_2F_{11}O_4SK$.—Calculated (percent): C, 19.53; H, 0.47; F, 48.6. Found (percent): C, 19.28; H, 0.42; F, 47.8.

A 0.2% by weight solution of the sulfate salt as produced above was prepared using aqueous hydrochloric acid having a pH of about 2. A weighed steel coupon, 1″ x 1″ by 0.005″, which had been cleaned in acetone, was placed into the solution. A similar coupon was placed into another solution containing only the hydrochloric acid and having a pH of about 2. The coupons were immersed in the respective solutions for 10 days at room temperature whereupon they were removed, rinsed, dried and re-weighed. The coupon taken from the sulfate salt containing solution showed 33% less weight loss than the coupon immersed in the solution containing no sulfate salt. The compounds of the invention, therefore, show that they are excellent for use as corrosion inhibitors.

EXAMPLE 2

To a flask containing 724 gms. of $\alpha,\alpha$-dihydro-tridecafluoro-4-(methyl)-cyclohexane carbinol was slowly added 233 gms. of chlorosulfonic acid. The solution was stirred for 16 hours while maintaining a temperature of 20° C. and the solution was poured into a container containing crushed ice. To the resulting solution was slowly added a 25% solution of potassium hydroxide, a slight excess being added over that amount necessary to neutralize the mixture. A white precipitate was formed, separated by filtering and dried in a vacuum oven at 40° C. The product was identified to be potassium α,α-dihydro-perfluoro-4-(methyl)-cyclohexane carbinol sulfate, weighed 844 gms. to provide a yield of 87.9% and had a melting point of greater than 250° C.

$C_8H_2F_{13}O_4S$.—Calculated (percent): C, 20.00; H, 0.41; F, 51.6. Found (percent): C, 19.72; H, 0.43; F, 50.8.

The table shows the reagents used in methods of preparing the various compounds of the invention and also the aqueous surface tension measurements of perfluorocyclohexyl carbinol sulfate salts produce. The carbinol sulfonic acid was generated by the slow addition of one mole of sulfur trioxide (as 30 wt. percent in sulfuric acid), or of one mole of chlorosulfonic acid, to a stirred flask containing the α,α-dihydro-perfluorocarbinol described in the table. The reaction was subsequently stirred for one hour at room temperature. The resulting carbinol sulfonic acid was slowly added to a stirred aqueous solution containing one mole of the hydroxide of the alkali metal indicated in the table. The sodium and lithium salts were isolated by evaporating the resulting solutions. The potassium salts precipitated from the aqueous solution and were filtered off. All of the salts were white solids having a melting point greater than 250° C. The surface tension was determined with a Rosano Surface Tensiometer.

Other alkali metal containing compositions and sulfonating agents, as hereinbefore described, may also be employed in the examples to produce similar sulfate salt compositions having substantially the same properties.

What is claimed is:

1. A compound having the general structure:

$$X-C_6F_{10}-CH_2OSO_3^--Y^+$$

wherein,
X is fluorine or a $C_1$ to $C_{10}$ perfluoroalkyl group,
$C_6F_{10}$ is the perfluorocyclohexane moiety, and
Y is an alkali metal.

2. The compound of claim 1 wherein X is fluorine and Y is potassium.
3. The compound of claim 1 wherein X is fluorine and Y is sodium.
4. The compound of claim 1 wherein X is $CF_3$ and Y is potassium.
5. The compound of claim 1 wherein X is $CF_3$ and Y is sodium.
6. The compound of claim 1 wherein X is $C_4F_9$ and Y is potassium.
7. The compound of claim 1 wherein X is $C_4F_9$ and Y is sodium.
8. The compound of claim 1 wherein X is $CF_3$ and Y is lithium.

$$X-C_6F_{10}-CH_2OSO_3^--Y^+$$

TABLE

| Example number | Alcohol used | Sulfonating agent | X | Y+ | Surface tension, dynes/cm. at 20° C., weight percent concentration in water | | |
|---|---|---|---|---|---|---|---|
| | | | | | 0.1 | 1.0 | 2.0 |
| 3 | α,α-Dihydro-perfluorocyclohexane carbinol | SO₃ | F | K | 29.1 | 22.5 | |
| 4 | do | ClSO₃H | F | Na | 57.1 | 31.3 | 25.8 |
| 5 | α,α-Dihydro-perfluoro-4-(methyl)-cyclohexane carbinol | ClSO₃H | CF₃ | K | 47.3 | 28.4 | 23.2 |
| 6 | do | ClSO₃H | CF₃ | Na | 46.8 | 26.6 | 21.1 |
| 7 | α,α-Dihydro-perfluoro-4-(n-butyl)-cyclohexane carbinol | SO₃ | C₄F₉ | K | 64.5 | 31.3 | 21.5 |
| 8 | do | SO₃ | C₄F₉ | Na | | | |
| 9 | α,α-Dihydro-perfluoro-3-(methyl)-cyclohexane carbinol | SO₃ | CF₃ | Li | 46.3 | 28.4 | 21.3 |

References Cited

UNITED STATES PATENTS

| | | | |
|---|---|---|---|
| 3,255,227 | 6/1966 | Weil | 260—458 X |
| 3,332,978 | 7/1967 | Caldwell | 260—458 |
| 3,223,516 | 12/1965 | Gilbert | 260—458 X |
| 3,017,421 | 1/1962 | Cohen | 260—458 X |
| 2,519,983 | 8/1950 | Simons | 204—62 |
| 3,283,012 | 11/1966 | Day | 260—458 X |
| 2,559,751 | 7/1951 | Berry et al. | 260—458 |
| 3,651,120 | 3/1972 | Avello et al. | 260—458 |
| 2,803,656 | 8/1957 | Ohlbrecht et al. | 260—458 X |

OTHER REFERENCES

Fluorine Chemistry (vol. II), J. Simons, pp. 351–52 (1954).

LEON ZITVER, Primary Examiner

LEO B. DeCRESCENTE, Assistant Examiner

U.S. Cl. X.R.

106—2; 252—353, 395; 260—633